(No Model.) 5 Sheets—Sheet 1.
H. B. WESTON.
GATE.
No. 605,455. Patented June 7, 1898.
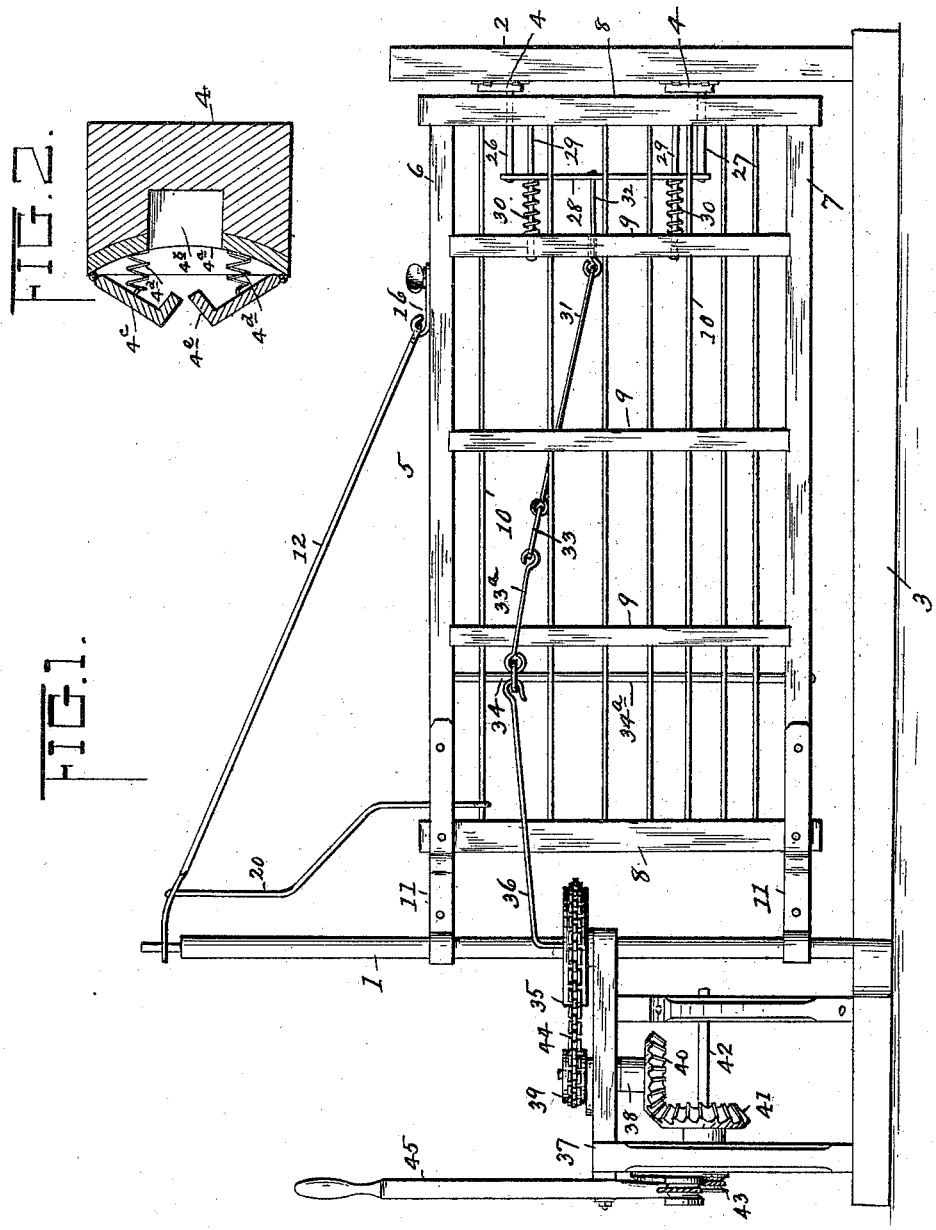
WITNESSES
INVENTOR
Henry B. Weston
by Attorneys.
THE NORRIS PETERS CO., PHOTO-LITHO., WASHINGTON, D. C.

(No Model.) 5 Sheets—Sheet 2.
H. B. WESTON.
GATE.
No. 605,455. Patented June 7, 1898.
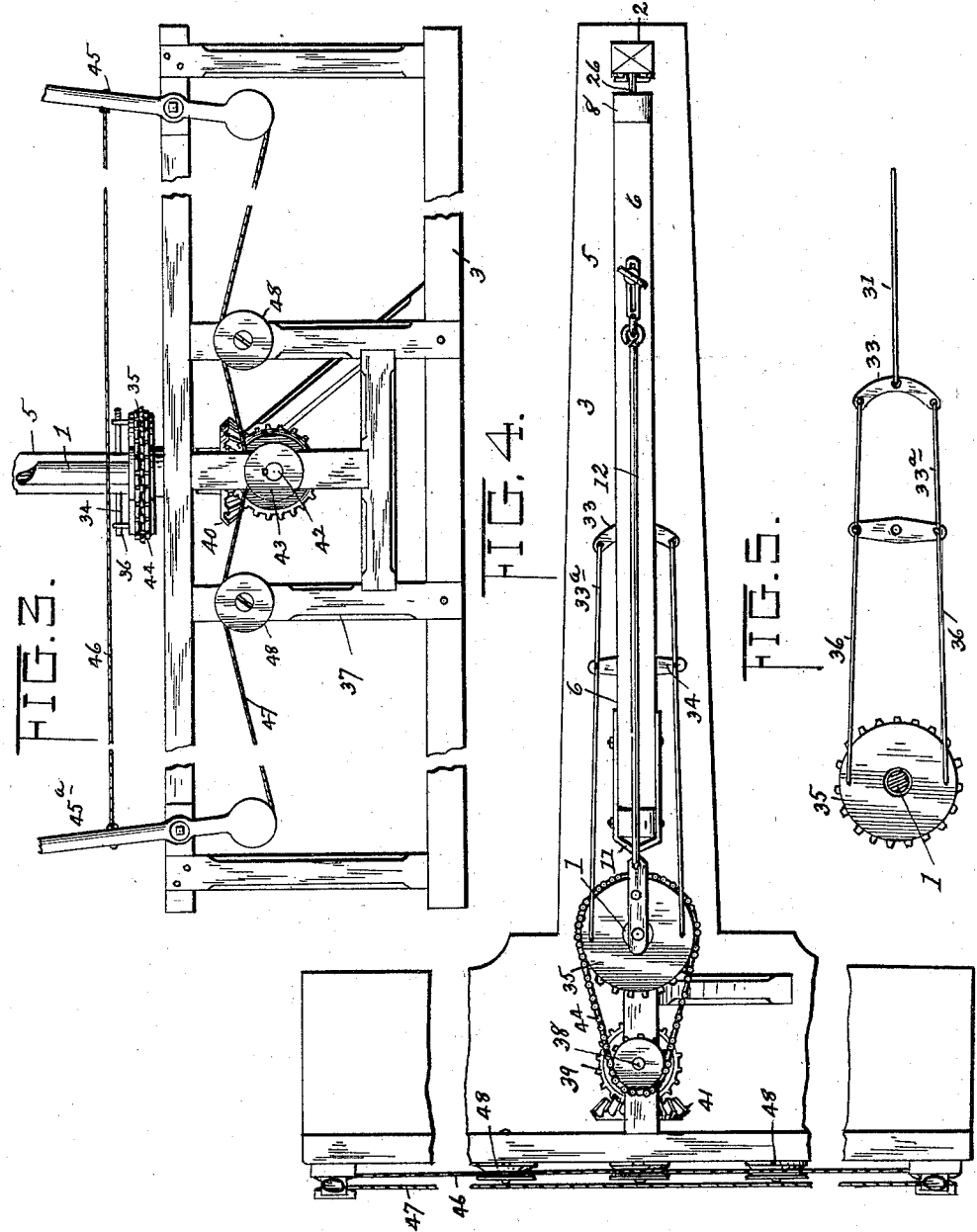

(No Model.) 5 Sheets—Sheet 3.
H. B. WESTON.
GATE.
No. 605,455. Patented June 7, 1898.
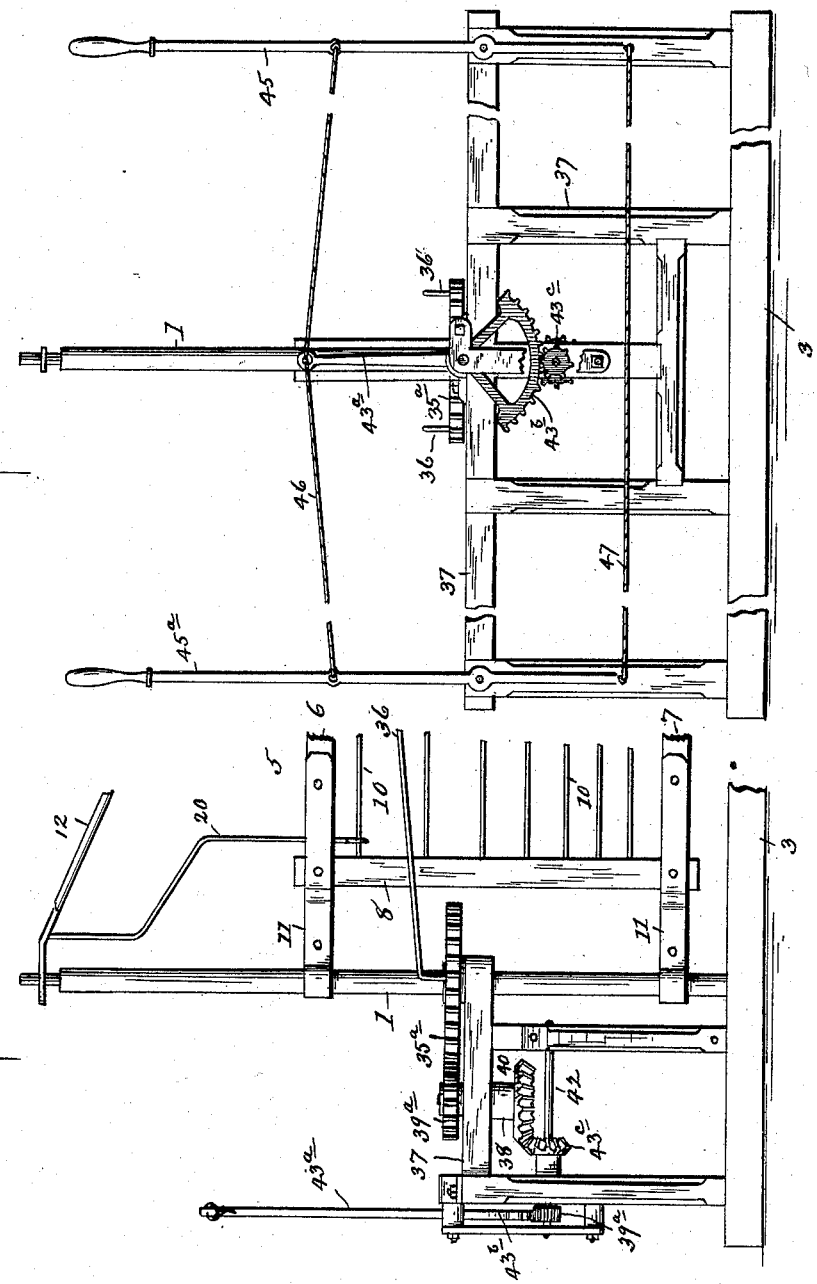
WITNESSES
INVENTOR
Henry B. Weston.
By R. S. & A. B. Lacey,
Attorneys.

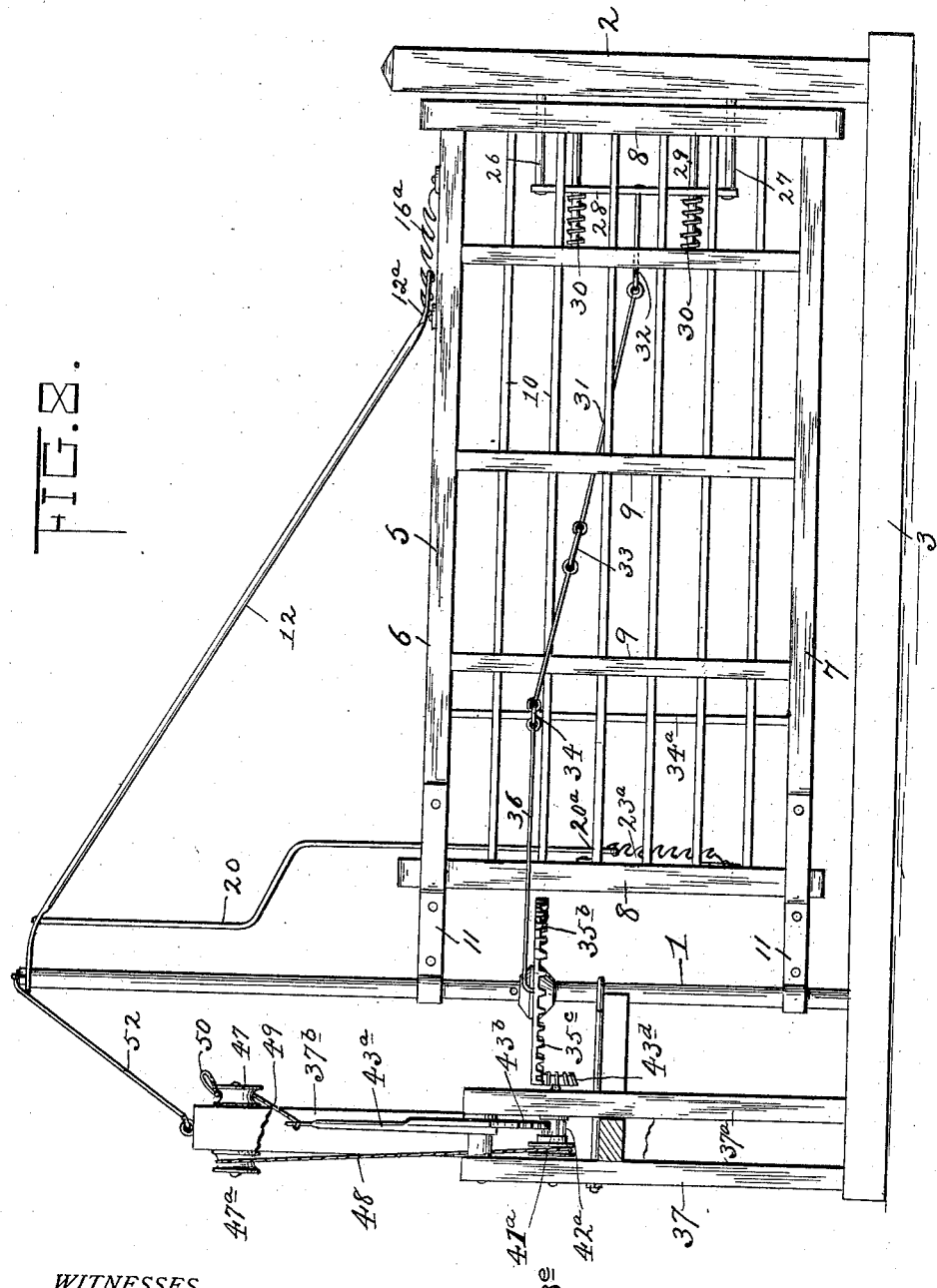

(No Model.)
H. B. WESTON.
GATE.
No. 605,455.
5 Sheets—Sheet 5.
Patented June 7, 1898.
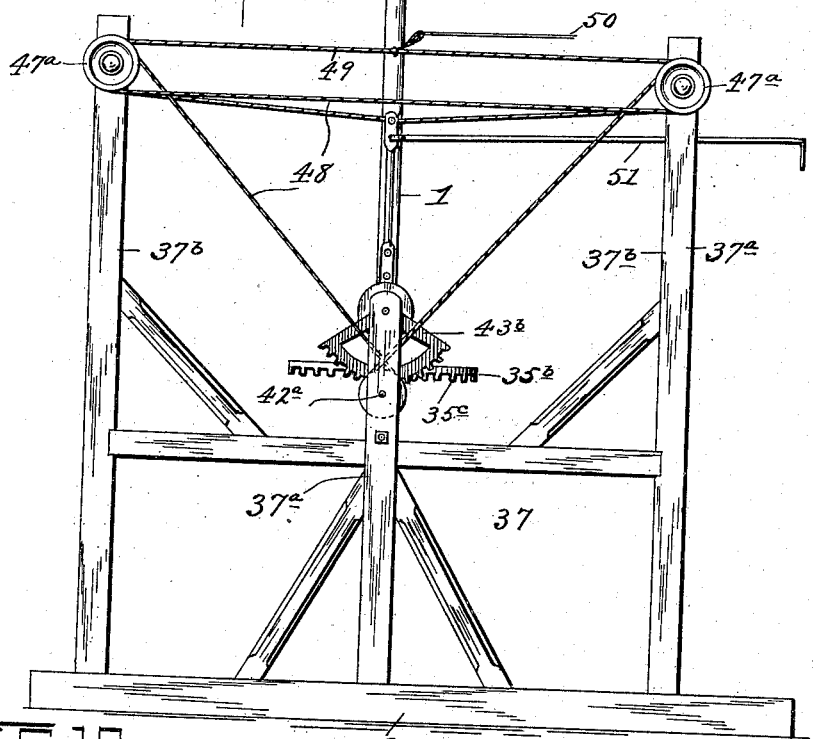
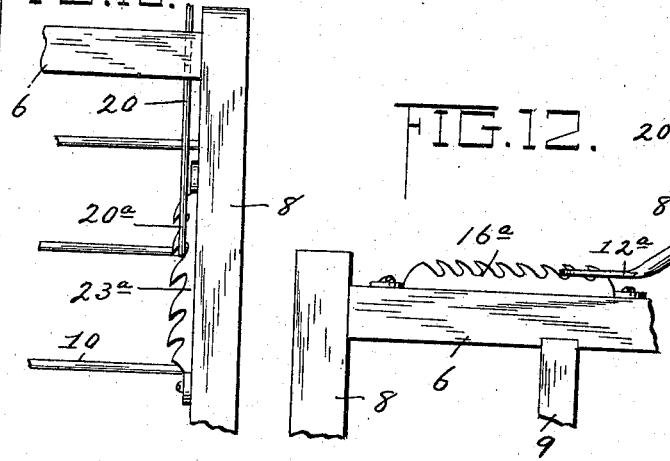
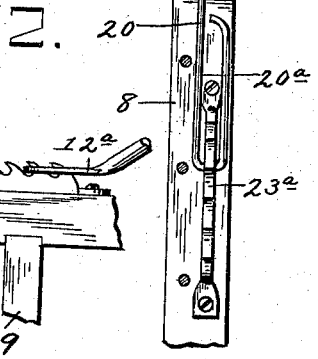
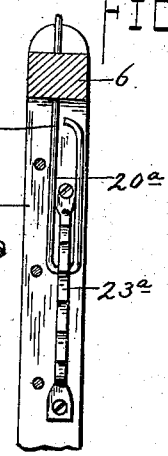
WITNESSES
Saml R. Turner
C. C. Niner
INVENTOR
Henry B. Weston
By
Attorneys.

UNITED STATES PATENT OFFICE.

HENRY B. WESTON, OF KENTON, OHIO, ASSIGNOR OF ONE-HALF TO BESSIE W. THOMSON, OF SAME PLACE.

GATE.

SPECIFICATION forming part of Letters Patent No. 605,455, dated June 7, 1898.

Application filed August 25, 1897. Serial No. 649,510. (No model.)

*To all whom it may concern:*

Be it known that I, HENRY B. WESTON, a citizen of the United States, residing at Kenton, in the county of Hardin and State of Ohio, have invented certain new and useful Improvements in Gates; and I do hereby declare the following to be a full, clear, and exact description of the invention, such as will enable others skilled in the art to which it appertains to make and use the same.

This invention has for its object the production of novel and improved latch mechanism and opening and closing mechanism for farm and other gates, and relates more particularly to improvements in the gate mechanism shown and described in my application for Letters Patent of the United States for gates filed August 10, 1897, Serial No. 647,727.

To this end the invention consists in the novel constructions, combinations, and arrangements of parts hereinafter more fully described, and particularly pointed out in the appended claims.

In the accompanying drawings, hereto annexed and forming part of this specification, Figure 1 is an elevation of a gate embodying my invention. Fig. 2 is a detail horizontal sectional view of one of the keeper-blocks of the latch mechanism. Fig. 3 is an end elevation of the gate; Fig. 4, a top plan view of the same; Fig. 5, a plan view of the latch-operating mechanism. Fig. 6 is an elevation of a portion of the gate, illustrating a modification of the gate opening and closing mechanism; and Fig. 7 is an end elevation of the same. Fig. 8 is a side elevation, Fig. 9 an end elevation, and Figs. 10, 11, and 12 detail views, illustrating a further modification.

Referring now more particularly to the accompanying drawings, 1 2 represent the hinging and keeper posts; 3, a base to which said posts may be secured; 4, keeper-blocks on the keeper-posts adapted to receive the latch-bolts, and 5 the gate, connected to the said hinging-post by the hinges 11. These hinges encompass the post and are adapted to slide loosely thereon.

The gate may be of any approved construction, but in the present instance comprises the bottom and top bars 6 7, vertical end bars 8, vertical pickets 9, and horizontal strands of wire or cables 10, extending through orifices in the pickets and connected with the said end bars.

This gate embodies substantially the same structural features as the gate shown in my former application for Letters Patent above noted. It is provided also with the brace and supporting rod 12, swiveled to the hinging-post, hanger-rod 20, and slotted adjusting-plate 16, whereby the gate may be vertically adjusted to open above the surface of ice and snow or other obstructions, as set forth in said application. It is to be understood, however, that I do not limit my present invention to its use with a vertically-adjustable gate or to a gate embodying the specific structure above described.

26 27 represent bolts slidable in openings in the bar 8 and adapted to engage the keeper-blocks 4. Said bolts are connected by a plate 28, sliding on rods 29, and are normally held projected by springs 30, encompassing said rods and bearing against the connecting-plate. The keeper-blocks 4 are suitably secured to the post 2 and are formed with an outer concaved face $4^a$ and a socket $4^b$ for reception of the bolts. Each keeper-block is provided with two oppositely-disposed hinged catch-plates $4^c$, normally held projected at an angle by springs $4^d$, and jaws or tongues $4^e$ to engage the bolts firmly, so that they cannot be accidentally retracted. When the gate is closed, the bolts ride on the face of the latch-plates and then snap into the socket $4^b$ between said jaws.

The latch-operating mechanism and gate opening and closing mechanism differ essentially from that shown in my former application, as will now be described.

A retractor-bar 32 is attached to the bolt-connecting plate 28, and a rod 31 connects said bar with a bridge plate or bar 33, which in turn is connected by parallel link-rods $33^a$ to the opposite ends of an operating-lever 34, centrally pivoted upon a post or rod $34^a$ on the gate.

35 represents a sprocket-wheel loosely mounted to oscillate upon the post 1 and in connection with the lever 34 by two parallel connecting-rods 36, pivoted thereto.

A stand or frame 37 is arranged alongside the hinging-post 1 and may form part of the fencing at one side of the gateway. In this frame is mounted a vertical shaft 38, carrying at its upper end a sprocket 39 and at its lower end a bevel-gear 40, which meshes with a bevel-gear 41 on a horizontal drive-shaft 42, which shaft also carries a drum or pulley 43. A chain 44 connects the two sprockets 35 39.

45 $45^a$ represent pivoted operating-levers mounted at opposite ends of the frame 37 and connected to move in unison by a cord or wire 46. The lower ends of these levers are connected by a cord, rope, or cable 47, passing over pulleys 48 on the frame and wrapped about the drum or pulley 43 in such manner that when either lever is moved the horizontal shaft 42 will be turned and caused to revolve the shaft 38, which by means of its sprocket 39 and chain 44 will impart motion to the oscillatory sprocket 35. In practice the two operating-levers will be arranged at a proper distance apart to enable them to be operated from a vehicle and to allow the gate to open or close without coming in contact with the vehicle. The sprocket 35 will be moved in one direction or the other, according to the direction in which the levers are moved, and will partially rotate on the post 2 and move the connecting-rods 36 in reverse directions, causing the lever 34 to draw on the bridge-plate 33 and retractor-rod 31 and release the bolts 27, leaving the gate free to swing open. Upon the further movement of said sprocket in the same direction when the bolts are fully retracted the gate will be forced open, and upon the lever being moved the opposite way the bolts will be retracted in the same manner and the gate closed.

The construction of latch and gate opening and closing mechanism may be modified by employing in lieu of the sprockets 35 39 and chain 44 an oscillatory gear-wheel $35^a$ and a pinion $39^a$, meshing therewith, as shown in Figs. 6 and 7. As a further modification a pivoted lever $43^a$, carrying at its lower end a segment-rack $43^b$, may be provided on the frame 37, and the horizontal shaft 42, provided with a spur-pinion $43^c$, in place of the drum or pulley 43, to gear with said rack. In this construction the cords, ropes, or cables $47^a$ are connected with said lever $43^a$, so that when either operating-lever is moved the gearing will be operated to retract the bolts and open or close the gate. The segment-rack $43^b$ and spur-pinion $43^c$ may be satisfactorily employed in connection with the sprocket-wheels 35 39 and chain 44 or intermeshing gear-wheels $35^a$ $39^a$.

In the modification of my invention shown in Figs. 8 to 12, inclusive, the oscillatory gear $35^b$ is provided on its under side with teeth $35^c$, which mesh with a bevel-wheel $43^d$ on a horizontal shaft $42^a$, revolubly mounted in the frame 37, which shaft is also provided with a pinion $41^a$ and pulley $43^e$. The segment-rack $43^b$ of the pivoted lever $43^a$ gears with the pinion $41^a$ and is pivoted between two short intermediate posts or stands $37^b$ of the frame 37. Each end standard $37^b$ of the frame carries a pair of pulleys 47 $47^a$, and over the two pulleys $47^a$ passes a continuous cord, rope, or cable 48, which also passes around the pulley $43^e$. Another continuous cord, rope, or cable 49 passes over the pulleys 47 and is connected with the lever $43^a$, and to said cord may be attached a cord or wire 50, by which the gate opening and closing mechanism may be operated from a distance. An operating-rod 51, working in a guide on the frame, may also be provided for this purpose. The operation with this construction will be readily understood. The adjusting-plates $16^a$ $23^a$ may be formed with rack-teeth, as shown, to engage pawl-loops $12^a$ $20^a$ on the supporting-rod 12 and hanger-rod 20. Stay-rods 52 may connect between the frame and hinging-post 1.

I desire it understood that I do not limit my invention to the specific construction and arrangement of parts herein shown and described, but reserve to myself the right to make such changes and modifications as fairly fall within the spirit and scope of my invention.

Having thus fully described my invention, what I claim as new and useful, and desire to secure by Letters Patent of the United States, is—

1. In gates, the combination of the gate-posts, a gate hinged or pivoted to one post, latch mechanism on the gate to engage the other post, a gear-wheel loosely mounted on the hinging-post to oscillate, a lever centrally pivoted on the gate, rods pivoted to the said gear and connected with opposite ends of said lever, a connecting-plate, link-rods connecting the said lever and connecting-plate, a connection between the connecting-plate and latch mechanism, and mechanism for operating said oscillatory gear, substantially as described.

2. In gates, the combination of the gate-posts, a gate hinged or pivoted to one post and provided with latch mechanism to engage the other post, an oscillatory gear-wheel on the hinging-post, a pivoted lever on the gate, connecting-rods between the gear-wheel and said lever, a retractor-rod connecting said pivoted lever and latch mechanism, a vertical shaft having at its upper end a gear in connection with said oscillatory gear and carrying at its lower end a bevel-gear, a horizontal drive-shaft having a bevel-gear meshing with said bevel-gear on the vertical shaft, pivoted operating-levers, and a connection between said levers and drive-shaft for operating the latter, substantially as described.

3. In swinging gates, the combination with the gate-posts, of a gate hinged or pivoted to one post and provided with a latch device to engage the other post, an oscillatory sprocket-wheel on the hinging-post, a connection between said gear-wheel and the latch device to retract the latter and swing the gate, a vertical shaft carrying at its upper end a sprocket-pinion and at its lower end a bevel-gear, a horizontal drive-shaft carrying a bevel-gear meshing with said bevel-gear on the vertical shaft and a drum or pulley, a chain connecting said sprocket-pinion and oscillatory sprocket-wheel, pivoted operating-levers, and connections between said levers and the said drum or pulley, substantially as described.

In testimony whereof I affix my signature in presence of two witnesses.

HENRY B. WESTON.

Witnesses:
JAMES RAY STILLINGS,
JOHN STILLINGS.